US012726918B2

(12) United States Patent
Zheng et al.

(10) Patent No.: US 12,726,918 B2
(45) Date of Patent: Sep. 1, 2026

(54) TRANSMIT POWER CONTROL ACCUMULATION CORRECTION

(71) Applicant: Apple Inc., Cupertino, CA (US)

(72) Inventors: Baohua Zheng, San Diego, CA (US); Prashant H. Vashi, San Jose, CA (US)

(73) Assignee: Apple Inc., Cupertino, CA (US)

( * ) Notice: Subject to any disclaimer, the term of this patent is extended or adjusted under 35 U.S.C. 154(b) by 388 days.

(21) Appl. No.: 18/141,346

(22) Filed: Apr. 28, 2023

(65) Prior Publication Data

US 2023/0354222 A1 Nov. 2, 2023

Related U.S. Application Data

(60) Provisional application No. 63/336,904, filed on Apr. 29, 2022.

(51) Int. Cl.
*H04W 52/54* (2009.01)
*H04W 52/14* (2009.01)
*H04W 52/36* (2009.01)

(52) U.S. Cl.
CPC ......... *H04W 52/54* (2013.01); *H04W 52/146* (2013.01); *H04W 52/36* (2013.01)

(58) Field of Classification Search
CPC ... H04W 52/54; H04W 52/146; H04W 52/36; H04W 52/38; H04W 52/365
See application file for complete search history.

(56) References Cited

U.S. PATENT DOCUMENTS 9,307,496 B2 4/2016 Saitoh
9,313,735 B2 4/2016 Kim et al.
10,959,184 B2 3/2021 Suzuki et al.
11,540,225 B2 * 12/2022 Takeda .................. H04L 5/1469
2015/0223174 A1 8/2015 Larsson et al.
2019/0253986 A1 * 8/2019 Jeon ...................... H04L 5/0048
2021/0105765 A1 4/2021 Cirik et al.
2023/0354222 A1 11/2023 Zheng et al.

FOREIGN PATENT DOCUMENTS

CN 115190572 10/2022
EP 4319327 A1 * 2/2024 .......... H04W 52/146
GB 2492600 1/2013

* cited by examiner

*Primary Examiner* — John J Lee
(74) *Attorney, Agent, or Firm* — Fish & Richardson P.C.

(57) ABSTRACT

Disclosed are methods, systems, and computer-readable medium to perform operations including receiving, from a base station, an indication to accumulate a transmit power control (TPC) adjustment value, the accumulated TPC adjustment value used to calculate an uplink (UL) transmit power; detecting at least one UE action that triggers adjusting the accumulated TPC adjustment value; and in response to detecting the at least one UE action, adjusting the accumulated TPC adjustment value.

20 Claims, 4 Drawing Sheets

TRANSMIT POWER CONTROL ACCUMULATION CORRECTION

CROSS REFERENCE TO RELATED APPLICATIONS

This application claims priority to U.S. Provisional Patent Application No. 63/336,904, filed Apr. 29, 2022, the content of which is incorporated herein by reference.

BACKGROUND

Wireless communication networks provide integrated communication platforms and telecommunication services to wireless user devices. Example telecommunication services include telephony, data (e.g., voice, audio, and/or video data), messaging, internet-access, and/or other services. The wireless communication networks have wireless access nodes that exchange wireless signals with the wireless user devices using wireless network protocols, such as protocols described in various telecommunication standards promulgated by the Third Generation Partnership Project (3GPP). Example wireless communication networks include code division multiple access (CDMA) networks, time division multiple access (TDMA) networks, frequency-division multiple access (FDMA) networks, orthogonal frequency-division multiple access (OFDMA) networks, Long Term Evolution (LTE), and Fifth Generation New Radio (5G NR). The wireless communication networks facilitate mobile broadband service using technologies such as OFDM, multiple input multiple output (MIMO), advanced channel coding, massive MIMO, beamforming, and/or other features.

SUMMARY

This disclosure describes systems and methods for correcting a transmit power control accumulation (TPC) adjustment value, e.g., in scenarios where the TPC adjustment value may have become outdated. In one embodiment, a user equipment (UE) is configured to adjust the TPC adjustment value in response to detecting at least one action that is indicative of a TPC adjustment value possibly being outdated. The actions can include the UE switching an antenna (e.g., transmitter [Tx] or receiver [Rx] antenna), switching a Synchronization Signal Block (SSB), and switching a beam (e.g., Tx or Rx beam). Switching an SSB may involve switching from one configured SSB to another configured SSB for the cell. In some examples, adjusting the TPC adjustment value involves resetting the TPC adjustment value. In other examples, adjusting the TPC adjustment value involves reducing the accumulated value by a predetermined factor.

In accordance with one aspect of the present disclosure, a method to be performed by a UE involves: receiving an indication to accumulate a transmit power control (TPC) adjustment value, the accumulated TPC adjustment value used to calculate an uplink (UL) transmit power; detecting at least one UE action that triggers adjusting the accumulated TPC adjustment value; and in response to detecting the at least one UE action, adjusting the accumulated TPC adjustment value.

Other versions include corresponding systems, apparatus, and computer programs to perform the actions of methods defined by instructions encoded on computer readable storage devices. These and other versions may optionally include one or more of the following features.

In some implementations, the method further involves using the accumulated TPC adjustment value to calculate the UL transmit power.

In some implementations, the UL transmit power is one of: a PUSCH transmission power, a PUCCH transmission power, or an SRS transmission power.

In some implementations, the at least one designated action includes at least one of switching an antenna, switching a Synchronization Signal Block (SSB), or switching a beam.

In some implementations, the antenna is a transmit antenna or a receive antenna of the UE, and where the beam is a transmit beam or a receive beam.

In some implementations, the SSB is a tracking SSB.

In some implementations, adjusting the accumulated TPC adjustment value involves resetting the accumulated TPC adjustment value to zero.

In some implementations, adjusting the accumulated TPC adjustment value involves: determining that the accumulated TPC adjustment value is greater than a first predetermined threshold; and responsively decreasing the accumulated TPC adjustment value by a first predetermined value (e.g., 3 dB).

In some implementations, adjusting the accumulated TPC adjustment value involves: determining that the accumulated TPC adjustment value is less than a second predetermined threshold; and responsively increasing the accumulated TPC adjustment value by a second predetermined value (e.g., 3 dB).

The details of one or more embodiments of these systems and methods are set forth in the accompanying drawings and description below. Other features, objects, and advantages of these systems and methods will be apparent from the description, drawings, and claims.

BRIEF DESCRIPTION OF THE FIGURES

Like reference numbers and designations in the various drawings indicate like elements.

DETAILED DESCRIPTION

Figure 1:
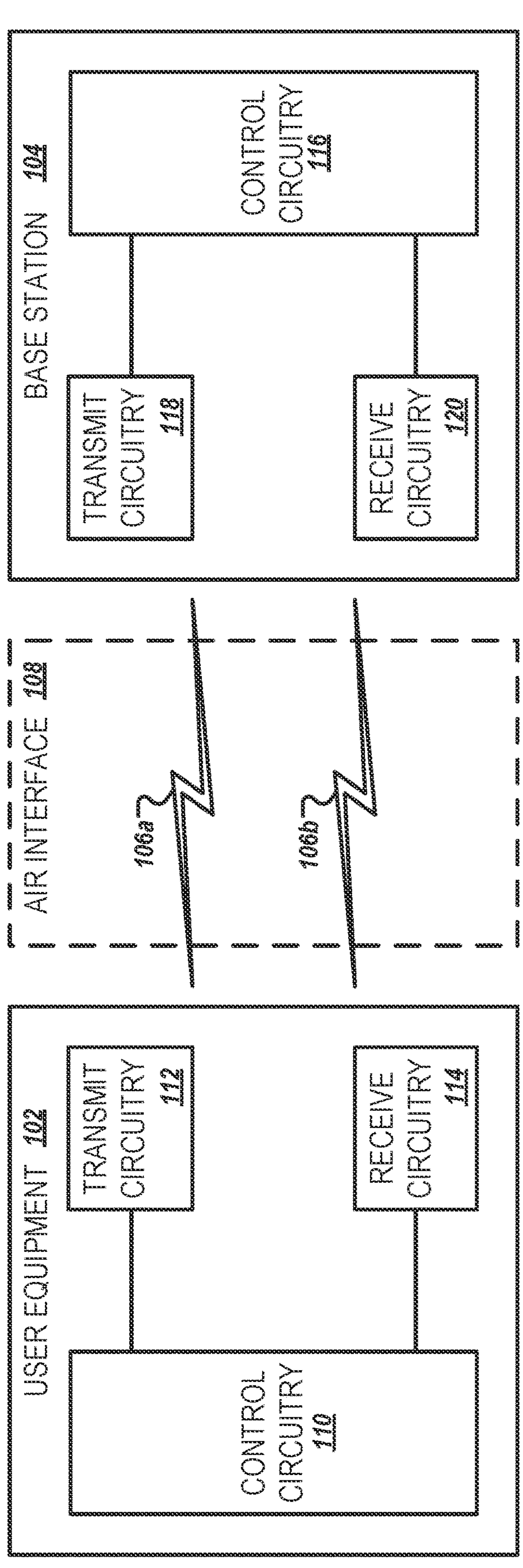
FIG. 1 illustrates an example wireless network, according to some implementations.
Figure 1:

In wireless communication systems, such as 5G NR, a user equipment (UE) calculates uplink (UL) transmission power based on several factors, such as pathloss measured from a downlink (DL) path, a frequency resource used for the transmission, and a transmit power control (TPC) adjustment. A base station serving the UE controls the TPC adjustment through a TPC command carried in a DL downlink control information (DCI) or a group power control DCI. One of the purposes of the TPC adjustment is to account for the difference between a pathloss measured on the DL path and transmission on the UL path.

In some scenarios, the base station can enable a TPC accumulation feature that causes the TPC adjustment to accumulate across more than one DCI. For example, if a UE first receives a DCI that requests a TPC with an adjustment value of "1," the UE will responsively add "1" to the transmit power. If the UE then receives a second DCI that requests a TPC with an adjustment value of "3," the UE will responsively add "4" to the transmit power (i.e., the sum of the adjustment values from the two DCIs). The base station can use the TPC accumulation feature to communicate TPC adjustment values that are too large to be communicated in the bits allocated for TPC adjustment values in DCI.

In some scenarios, the TPC adjustment accumulated based on previous radio frequency (RF) conditions is no longer accurate. These scenarios include the UE switching the transmit (Tx) antenna on the UL, the UE switching the receive (Rx) antenna on the DL, the UE switching a Synchronization Signal Block (SSB) on the DL, and the UE switching an Rx beam or Tx beam. In these scenarios, because the accumulated TPC adjustment is no longer accurate, the UE Tx power that is based on the outdated TPC adjustment could cause UL performance issues. As example, a base station may adjust the accumulated TPC to be a negative value, perhaps due to the evaluation of the received power. This means that the UE will deduct a certain amount of power from the calculated Tx transmission power. However, if the UE has switched the Tx antenna at a certain point, the TPC adjustment for the new antenna could be different from the original accumulation. In this scenario, the Tx power selected by the UE would be too low due to the negative TPC adjustment value. This can result in unsuccessful UL packets and/or an increase in an UL Block Error Rate (BLER).

As another example, a base station may adjust the accumulated TPC to be a positive value. Here, the UE adds a certain amount of power (based on the positive value) to the calculated Tx power for transmission. However, if the UE has switched the Tx antenna at certain point, the TPC adjustment for new antenna could be different from the original accumulation. Thus, the Tx power selected by the UE will be greater than what is needed for the transmission, which results in power waste. Note that although the base station may eventually adjust the TPC value to proper levels, the UE performance before doing so is nevertheless impacted.

This disclosure describes systems and methods that correct a TPC adjustment value in scenarios where the TPC adjustment value may have become outdated. In one embodiment, a UE is configured to reset the TPC adjustment value in response to detecting at least one action that is indicative of a TPC adjustment value possibly being outdated. The actions can include the UE switching an antenna (e.g., Tx or Rx antenna), switching an SSB (e.g., a tracking SSB), and switching a beam (e.g., Tx or Rx beam). Switching an SSB may involve switching from one configured SSB to another configured SSB for the cell. In some examples, the SSB is a tracking SSB.

FIG. 1 illustrates a wireless network 100, according to some implementations. The wireless network 100 includes a UE 102 and a base station 104 connected via one or more channels 106A, 106B across an air interface 108. The UE 102 and base station 104 communicate using a system that supports controls for managing the access of the UE 102 to a network via the base station 104.

In some implementations, the wireless network 100 may be a Non-Standalone (NSA) network that incorporates Long Term Evolution (LTE) and Fifth Generation (5G) New Radio (NR) communication standards as defined by the Third Generation Partnership Project (3GPP) technical specifications. For example, the wireless network 100 may be a E-UTRA (Evolved Universal Terrestrial Radio Access)-NR Dual Connectivity (EN-DC) network, or an NR-EUTRA Dual Connectivity (NE-DC) network. In some other implementations, the wireless network 100 may be a Standalone (SA) network that incorporates only 5G NR. Furthermore, other types of communication standards are possible, including future 3GPP systems (e.g., Sixth Generation (6G)), Institute of Electrical and Electronics Engineers (IEEE) 802.11 technology, IEEE 802.16 protocols, or the like. While aspects may be described herein using terminology commonly associated with 5G NR, aspects of the present disclosure can be applied to other systems, such as 3G, 4G, and/or systems subsequent to 5G (e.g., 6G).

In the wireless network 100, the UE 102 and any other UE in the system may be, for example, any of laptop computers, smartphones, tablet computers, machine-type devices such as smart meters or specialized devices for healthcare, intelligent transportation systems, or any other wireless device. In network 100, the base station 104 provides the UE 102 network connectivity to a broader network (not shown). This UE 102 connectivity is provided via the air interface 108 in a base station service area provided by the base station 104. In some implementations, such a broader network may be a wide area network operated by a cellular network provider, or may be the Internet. Each base station service area associated with the base station 104 is supported by one or more antennas integrated with the base station 104. The service areas can be divided into a number of sectors associated with one or more particular antennas. Such sectors may be physically associated with one or more fixed antennas or may be assigned to a physical area with one or more tunable antennas or antenna settings adjustable in a beamforming process used to direct a signal to a particular sector.

The UE 102 includes control circuitry 110 coupled with transmit circuitry 112 and receive circuitry 114. The transmit circuitry 112 and receive circuitry 114 may each be coupled with one or more antennas. The control circuitry 110 may include various combinations of application-specific circuitry and baseband circuitry. The transmit circuitry 112 and receive circuitry 114 may be adapted to transmit and receive data, respectively, and may include radio frequency (RF) circuitry and/or front-end module (FEM) circuitry.

In various implementations, aspects of the transmit circuitry 112, receive circuitry 114, and control circuitry 110 may be integrated in various ways to implement the operations described herein. The control circuitry 110 may be adapted or configured to perform various operations, such as those described elsewhere in this disclosure related to a UE. For instance, the control circuitry 110 can receive an indication to accumulate a transmit power control (TPC) adjustment value, the accumulated TPC adjustment value used to calculate an uplink (UL) transmit power. The control circuitry 110 can detect at least one designated action that triggers resetting the accumulated TPC adjustment value. Further, the control circuitry 110 can reset the accumulated TPC adjustment value. Yet further, the control circuitry 110 can use the accumulated TPC adjustment value to calculate the UL transmit power.

The transmit circuitry 112 can perform various operations described in this specification. For example, the transmit circuitry 112 can perform an UL transmission using the calculated UL transmit power. Additionally, the transmit circuitry 112 may transmit using a plurality of multiplexed uplink physical channels. The plurality of uplink physical channels may be multiplexed, e.g., according to time division multiplexing (TDM) or frequency division multiplexing (FDM) along with carrier aggregation. The transmit circuitry 112 may be configured to receive block data from the control circuitry 110 for transmission across the air interface 108.

The receive circuitry 114 can perform various operations described in this specification. For instance, the receive circuitry 114 can receive, from a base station, the indication to accumulate the TPC adjustment value. Additionally, the receive circuitry 114 may receive a plurality of multiplexed downlink physical channels from the air interface 108 and relay the physical channels to the control circuitry 110. The plurality of downlink physical channels may be multiplexed, e.g., according to TDM or FDM along with carrier aggregation. The transmit circuitry 112 and the receive circuitry 114 may transmit and receive, respectively, both control data and content data (e.g., messages, images, video, etc.) structured within data blocks that are carried by the physical channels.

FIG. 1 also illustrates the base station 104. In some implementations, the base station 104 may be a 5G radio access network (RAN), a next generation RAN, a E-UTRAN, a non-terrestrial cell, or a legacy RAN, such as a UTRAN. As used herein, the term "5G RAN" or the like may refer to the base station 104 that operates in an NR or 5G wireless network 100, and the term "E-UTRAN" or the like may refer to a base station 104 that operates in an LTE or 4G wireless network 100. The UE 102 utilizes connections (or channels) 106A, 106B, each of which includes a physical communications interface or layer.

The base station 104 circuitry may include control circuitry 116 coupled with transmit circuitry 118 and receive circuitry 120. The transmit circuitry 118 and receive circuitry 120 may each be coupled with one or more antennas that may be used to enable communications via the air interface 108. The transmit circuitry 118 and receive circuitry 120 may be adapted to transmit and receive data, respectively, to any UE connected to the base station 104. The receive circuitry 120 may receive a plurality of uplink physical channels from one or more UEs, including the UE 102.

In FIG. 1, the one or more channels 106A, 106B are illustrated as an air interface to enable communicative coupling, and can be consistent with cellular communications protocols, such as a UMTS protocol, a 3GPP LTE protocol, an Advanced long term evolution (LTE-A) protocol, a LTE-based access to unlicensed spectrum (LTE-U), a 5G protocol, a NR protocol, an NR-based access to unlicensed spectrum (NR-U) protocol, and/or any other communications protocol(s). In implementations, the UE 102 may directly exchange communication data via a ProSe interface. The ProSe interface may alternatively be referred to as a sidelink (SL) interface and may include one or more logical channels, including but not limited to a Physical Sidelink Control Channel (PSCCH), a Physical Sidelink Discovery Channel (PSDCH), and a Physical Sidelink Broadcast Channel (PSBCH).

In some implementations, the UE 102 is configured to calculate Tx power based on multiple factors, including, but not limited to, pathloss measured from a DL path, frequency resource used for the transmission, and TPC adjustment. In some examples, the UE 102 is configured to calculate the Tx power using one of Equations [1], [2], and [3]:

$$P_{PUSCH,b,f,c}(i, j, q_d, l) = \min\begin{Bmatrix} P_{CMAX,f,c}(i), \\ P_{O\_PUSCH,b,f,c}(j) + \\ 10\log_{10}(2^{\mu} \cdot M^{PUSCH}_{RB,b,f,c}(i)) + \\ \alpha_{b,f,c}(j) \cdot PL_{b,f,c}(q_d) + \\ \Delta_{TF,b,f,c}(i) + f_{b,f,c})(i, l) \end{Bmatrix} [\text{dBm}], \quad [1]$$

-continued $$P_{PUCCH,b,f,c}(i, q_u, q_d, l) = \min\begin{Bmatrix} P_{CMAX,f,c}(i), \\ P_{O\_PUCCH,b,f,c}(q_u) + \\ 10\log_{10}(2^{\mu} \cdot M^{PUCCH}_{RB,b,f,c}(i)) + \\ PL_{b,f,c}(q_d) + \Delta_{F\_PUCCH,}(F) + \\ \Delta_{TF,b,f,c}(i) + g_{b,f,c}(i, l) \end{Bmatrix} [\text{dBm}], \quad [2]$$

$$P_{SRS,b,f,c}(i, q_s, l) = \min\begin{Bmatrix} P_{CMAX,f,c}(i), \\ P_{O\_SRS,b,f,c}(q_s) + \\ 10\log_{10}(2^{\mu} \cdot M_{SRS,b,f,c}(i)) + \\ \alpha_{SRS,b,f,c}(q_s) \cdot PL_{b,f,c}(q_d) + \\ h_{b,f,c}(i, l) \end{Bmatrix} [\text{dBm}]. \quad [3]$$

Equation [1] is used to calculate PUSCH transmission power, Equation [2] is used to calculate PUCCH transmission power, and Equation [3] is used to calculate SRS transmission power. These equations are described in more detail in 3GPP Technical Specification (TS) 36.213 V17.1.0 and 3GPP TS 38.213 V16.9.0. Specifically, Equation [1] is described in more detail in section 5.1.1.1 of TS 36.213 and section 7.1.1 of TS 38.213. Equation [2] is described in more detail in section 5.1.2.1 of TS 36.213 and section 7.2.1 of TS 38.213. Equation [3] is described in more detail in section 5.1.3.1 of TS 36.213 and section 7.3.1 of TS 38.213.

In Equation [1], $f_{b,f,c}$(i,l) is the Tx Power Adjustment, $P_{CMAX,f,c}$(i) is the UE configured maximum output power defined in TS 38.101-1, TS 38.101-2, and TS 38.101-3 for carrier f of serving cell c in PUSCH transmission occasion i, and $P_{O\_PUSCH,b,f,c}$(j) is a parameter composed of the sum of a component $P_{O\_NOMINAL\_PUSCH,f,c}$(j) and a component $P_{O\_UE\_PUSCH,b,f,c}$(j) where $j \in \{0, 1, \ldots, J-1\}$. More specifically, $f_{b,f,c}$(i,l) is the PUSCH power control adjustment state l for active UL BWP b of carrier f of serving cell c and PUSCH transmission occasion i.

In Equation [2], $g_{b,f,c}$(i,l) is the Tx Power Adjustment and $P_{CMAX,f,c}$(i) is the UE configured maximum output power defined in TS 38.101-1, TS 38.101-2, and TS 38.101-3 for carrier f of primary cell c in PUCCH transmission occasion i. More specifically, $g_{b,f,c}$(i,l) is the current PUCCH power control adjustment state l for active UL BWP b of carrier f of primary cell c and PUCCH transmission occasion i.

In Equation [3], $h_{b,f,c}$(i,l)=$f_{b,f,c}$(i,l) is the Tx Power Adjustment and $P_{CMAX,f,c}$(i) is the UE configured maximum output power defined in TS 38.101-1, TS 38.101-2, and TS 38.101-3 for carrier f of serving cell c in SRS transmission occasion i. More specifically, $h_{b,f,c}$(i,l)=$f_{b,f,c}$(i,l), where $f_{b,f,c}$(i,l) is the current PUSCH power control adjustment state as described above, if srs-PowerControlAdjustmentStates indicates a same power control adjustment state for SRS transmissions and PUSCH transmissions.

In some implementations, the UE 102 is configured to receive an indication, perhaps from a serving base station, to accumulate the Tx Power Adjustment. In response to receiving the indication, the UE 102 is configured to accumulate the TPC adjustment across more than one DCI. Accordingly, the Tx Power Adjustment values in Equation [1]-[3] become accumulated Tx Power Adjustment values.

In some implementations, detect one or more designated actions that trigger adjusting a Tx Power Adjustment value (e.g., in Equations [1]-[3]). Within examples, the one or more actions include the UE 102 switching the Rx or Tx antenna, and the UE 102 switching a tracking SSB or beam (e.g., a Tx or Rx beam). In some implementations, in response to detecting at least one designated action, the UE 102 is configured to adjust a Tx Power Adjustment value. In particular, the UE 102 adjusts accumulation of the power control adjustment state for the active UL bandwidth part (BWP) of the serving cell.

In some implementations, for PUSCH power control, the UE 102 is configured to adjust accumulation of a PUSCH power control adjustment state for an active UL BWP b of carrier f of serving cell c in response to detecting at least one of the designated actions.

In some implementations, for PUCCH power control, if a configuration of a $P_{O\_PUCCH,b,f,c}(q_s)$ value for a corresponding PUCCH power control adjustment state l for active UL BWP b of carrier f of primary cell c is provided by higher layers, the UE 102 is configured to adjust the accumulation of a PUCCH power control adjustment state in response to detecting at least one of the designated actions.

In some implementations, for SRS power control, if a configuration for a $P_{O\_SRS,b,f,c}(q_s)$ value or for a $\alpha_{SRS,b,f,c}(q_s)$ value for a corresponding SRS power control adjustment state l for active UL BWP b of carrier f of serving cell c is provided by higher layers, the UE 102 is configured to adjust the accumulation of a SRS power control adjustment state in response to detecting at least one of the designated actions.

Figure 2:
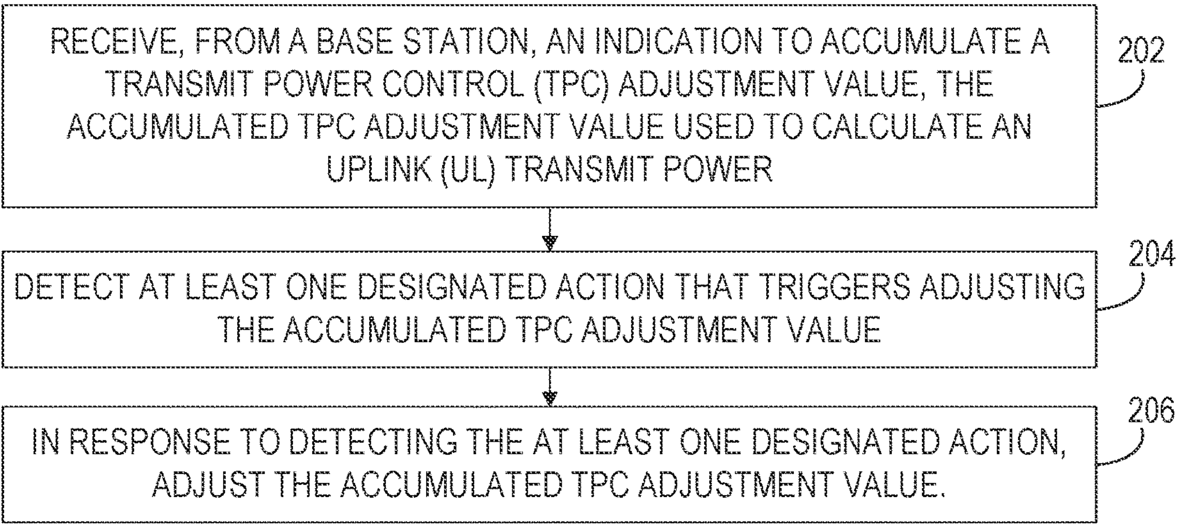
FIG. 2 illustrates a flowchart of an example method, according to some implementations.

FIG. 2 illustrates a flowchart of an example method 200, according to some implementations. For clarity of presentation, the description that follows describes method 200 in the context of the other figures in this description. For example, method 200 can be performed by the UE 102 of FIG. 1. It will be understood that method 200 can be performed, for example, by any suitable system, environment, software, hardware, or a combination of systems, environments, software, and hardware, as appropriate. In some implementations, various steps of method 200 can be run in parallel, in combination, in loops, or in any order.

At block 202, method 200 involves receiving, from a base station, an indication to accumulate a transmit power control (TPC) adjustment value, the accumulated TPC adjustment value used to calculate an uplink (UL) transmit power.

At block 204, method 200 involves detecting at least one designated action that triggers adjusting the accumulated TPC adjustment value.

At block 206, method 200 involves in response to detecting the at least one designated action, adjusting the accumulated TPC adjustment value.

In some implementations, method 200 further involves using the accumulated TPC adjustment value to calculate the UL transmit power.

In some implementations, the UL transmit power is one of: a PUSCH transmission power, a PUCCH transmission power, or an SRS transmission power.

In some implementations, the at least one designated action includes at least one of switching an antenna, switching a Synchronization Signal Block (SSB), or switching a beam.

In some implementations, the antenna is a transmit antenna or a receive antenna of the UE, and where the beam is a transmit beam or a receive beam.

In some implementations, the SSB is a tracking SSB.

In some implementations, adjusting the accumulated TPC adjustment value involves resetting the accumulated TPC adjustment value to zero.

In some implementations, adjusting the accumulated TPC adjustment value involves: determining that the accumulated TPC adjustment value is greater than a first predetermined threshold; and responsively decreasing the accumulated TPC adjustment value by a first predetermined value (e.g., 3 dB).

In some implementations, adjusting the accumulated TPC adjustment value involves: determining that the accumulated TPC adjustment value is less than a second predetermined threshold; and responsively increasing the accumulated TPC adjustment value by a second predetermined value (e.g., 3 dB).

In some examples, the first and second predetermined thresholds are the same. In other examples, the first and second predetermined thresholds are different. In some examples, the first and second predetermined values are the same. In other examples, the first and second predetermined values are different.

Figure 3:
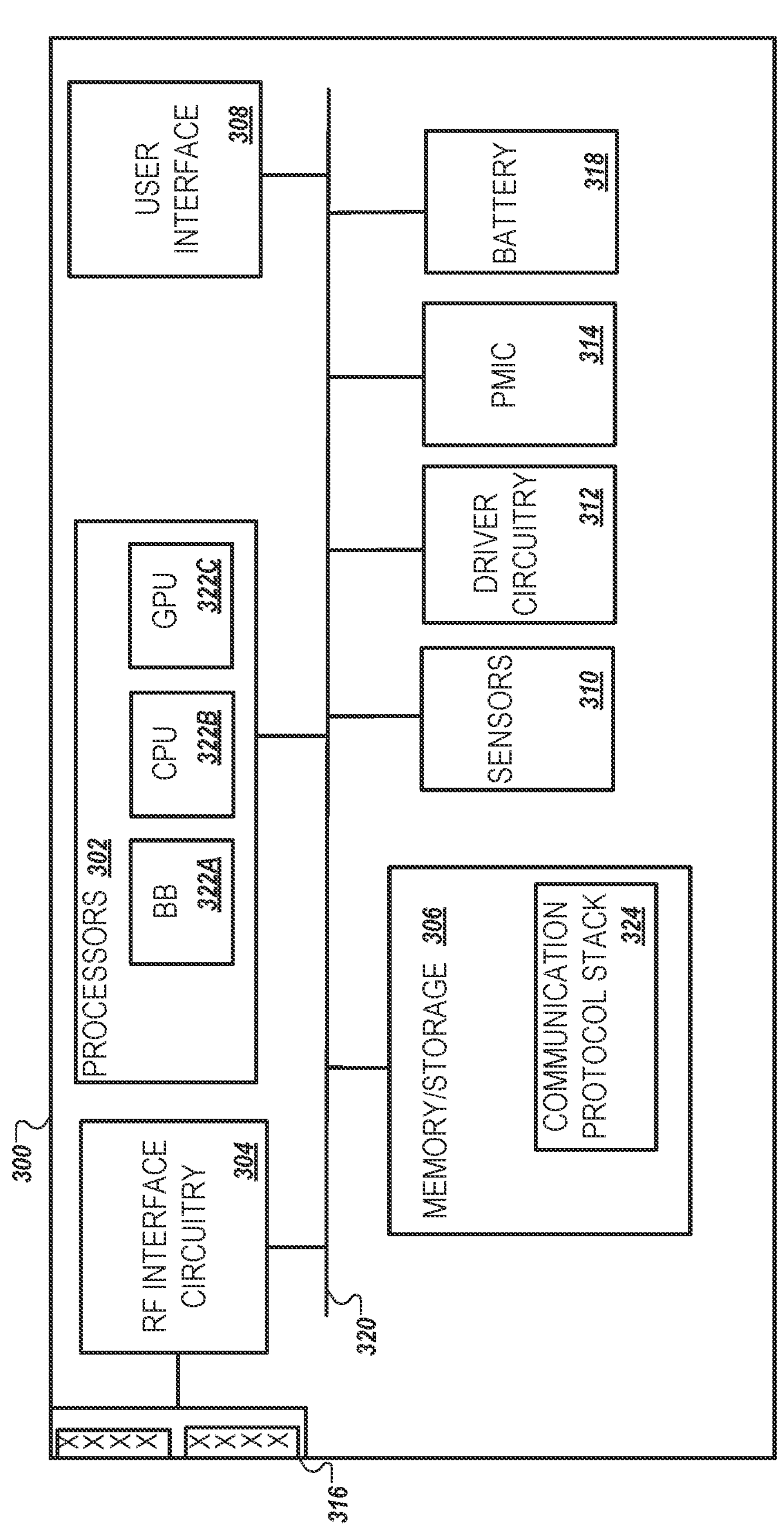
FIG. 3 illustrates an example user equipment (UE), according to some implementations.

FIG. 3 illustrates an example UE 300, according to some implementations. The UE 300 may be similar to and interchangeable with UE 102 of FIG. 1.

The UE 300 may be any mobile or non-mobile computing device, such as, for example, mobile phones, computers, tablets, industrial wireless sensors (for example, microphones, pressure sensors, thermometers, motion sensors, accelerometers, inventory sensors, electric voltage/current meters, etc.), video devices (for example, cameras, video cameras, etc.), wearable devices (for example, a smart watch), relaxed-IoT devices.

The UE 300 may include processors 302, RF interface circuitry 304, memory/storage 306, user interface 308, sensors 310, driver circuitry 312, power management integrated circuit (PMIC) 314, one or more antenna(s) 316, and battery 318. The components of the UE 300 may be implemented as integrated circuits (ICs), portions thereof, discrete electronic devices, or other modules, logic, hardware, software, firmware, or a combination thereof. The block diagram of FIG. 3 is intended to show a high-level view of some of the components of the UE 300. However, some of the components shown may be omitted, additional components may be present, and different arrangement of the components shown may occur in other implementations.

The components of the UE 300 may be coupled with various other components over one or more interconnects 320, which may represent any type of interface, input/output, bus (local, system, or expansion), transmission line, trace, optical connection, etc. that allows various circuit components (on common or different chips or chipsets) to interact with one another.

The processors 302 may include processor circuitry such as, for example, baseband processor circuitry (BB) 322A, central processor unit circuitry (CPU) 322B, and graphics processor unit circuitry (GPU) 322C. The processors 302 may include any type of circuitry or processor circuitry that executes or otherwise operates computer-executable instructions, such as program code, software modules, or functional processes from memory/storage 306 to cause the UE 300 to perform operations as described herein.

In some implementations, the baseband processor circuitry 322A may access a communication protocol stack 324 in the memory/storage 306 to communicate over a 3GPP compatible network. In general, the baseband processor circuitry 322A may access the communication protocol stack to: perform user plane functions at a physical (PHY) layer, medium access control (MAC) layer, radio link control (RLC) layer, packet data convergence protocol (PDCP) layer, service data adaptation protocol (SDAP) layer, and PDU layer; and perform control plane functions at a PHY layer, MAC layer, RLC layer, PDCP layer, RRC layer, and a non-access stratum layer. In some implementations, the PHY layer operations may additionally/alternatively be performed by the components of the RF interface circuitry 304. The baseband processor circuitry 322A may generate or process baseband signals or waveforms that carry information in 3GPP-compatible networks. In some implementations, the waveforms for NR may be based cyclic prefix orthogonal frequency division multiplexing (OFDM) "CP-OFDM" in the uplink or downlink, and discrete Fourier transform spread OFDM "DFT-S-OFDM" in the uplink.

The memory/storage 306 may include one or more non-transitory, computer-readable media that includes instructions (for example, communication protocol stack 324) that may be executed by one or more of the processors 302 to cause the UE 300 to perform various operations described herein. The memory/storage 306 include any type of volatile or non-volatile memory that may be distributed throughout the UE 300. In some implementations, some of the memory/storage 306 may be located on the processors 302 themselves (for example, L1 and L2 cache), while other memory/storage 306 is external to the processors 302 but accessible thereto via a memory interface. The memory/storage 306 may include any suitable volatile or non-volatile memory such as, but not limited to, dynamic random-access memory (DRAM), static random-access memory (SRAM), erasable programmable read only memory (EPROM), electrically erasable programmable read only memory (EEPROM), Flash memory, solid-state memory, or any other type of memory device technology.

The RF interface circuitry 304 may include transceiver circuitry and radio frequency front module (RFEM) that allows the UE 300 to communicate with other devices over a radio access network. The RF interface circuitry 304 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna(s) 316 and proceed to filter and amplify (with a low-noise amplifier) the signal. The signal may be provided to a receiver of the transceiver that downconverts the RF signal into a baseband signal that is provided to the baseband processor of the processors 302.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna(s) 316. In various implementations, the RF interface circuitry 304 may be configured to transmit/receive signals in a manner compatible with NR access technologies.

The antenna(s) 316 may include one or more antenna elements to convert electrical signals into radio waves to travel through the air and to convert received radio waves into electrical signals. The antenna elements may be arranged into one or more antenna panels. The antenna(s) 316 may have antenna panels that are omnidirectional, directional, or a combination thereof to enable beamforming and multiple input, multiple output communications. The antenna(s) 316 may include microstrip antennas, printed antennas fabricated on the surface of one or more printed circuit boards, patch antennas, phased array antennas, etc. The antenna(s) 316 may have one or more panels designed for specific frequency bands including bands in FR1 or FR2.

The user interface 308 includes various input/output (I/O) devices designed to enable user interaction with the UE 300. The user interface 308 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs), or more complex outputs such as display devices or touchscreens (for example, liquid crystal displays "LCDs," LED displays, quantum dot displays, proj ectors, etc.), with the output of characters, graphics, multimedia objects, and the like being generated or produced from the operation of the UE 300.

The sensors 310 may include devices, modules, or subsystems whose purpose is to detect events or changes in its environment and send the information (sensor data) about the detected events to some other device, module, subsystem, etc. Examples of such sensors include, inter alia, inertia measurement units including accelerometers, gyroscopes, or magnetometers; microelectromechanical systems or nanoelectromechanical systems including 3-axis accelerometers, 3-axis gyroscopes, or magnetometers; level sensors; temperature sensors (for example, thermistors); pressure sensors; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 312 may include software and hardware elements that operate to control particular devices that are embedded in the UE 300, attached to the UE 300, or otherwise communicatively coupled with the UE 300. The driver circuitry 312 may include individual drivers allowing other components to interact with or control various input/output (I/O) devices that may be present within, or connected to, the UE 300. For example, driver circuitry 312 may include a display driver to control and allow access to a display device, a touchscreen driver to control and allow access to a touchscreen interface, sensor drivers to obtain sensor readings of sensors 310 and control and allow access to sensors 310, drivers to obtain actuator positions of electro-mechanic components or control and allow access to the electro-mechanic components, a camera driver to control and allow access to an embedded image capture device, audio drivers to control and allow access to one or more audio devices.

The PMIC 314 may manage power provided to various components of the UE 300. In particular, with respect to the processors 302, the PMIC 314 may control power-source selection, voltage scaling, battery charging, or DC-to-DC conversion.

In some implementations, the PMIC 314 may control, or otherwise be part of, various power saving mechanisms of the UE 300. A battery 318 may power the UE 300, although in some examples the UE 300 may be mounted deployed in a fixed location, and may have a power supply coupled to an electrical grid. The battery 318 may be a lithium-ion battery, a metal-air battery, such as a zinc-air battery, an aluminum-air battery, a lithium-air battery, and the like. In some implementations, such as in vehicle-based applications, the battery 318 may be a typical lead-acid automotive battery.

Figure 4:
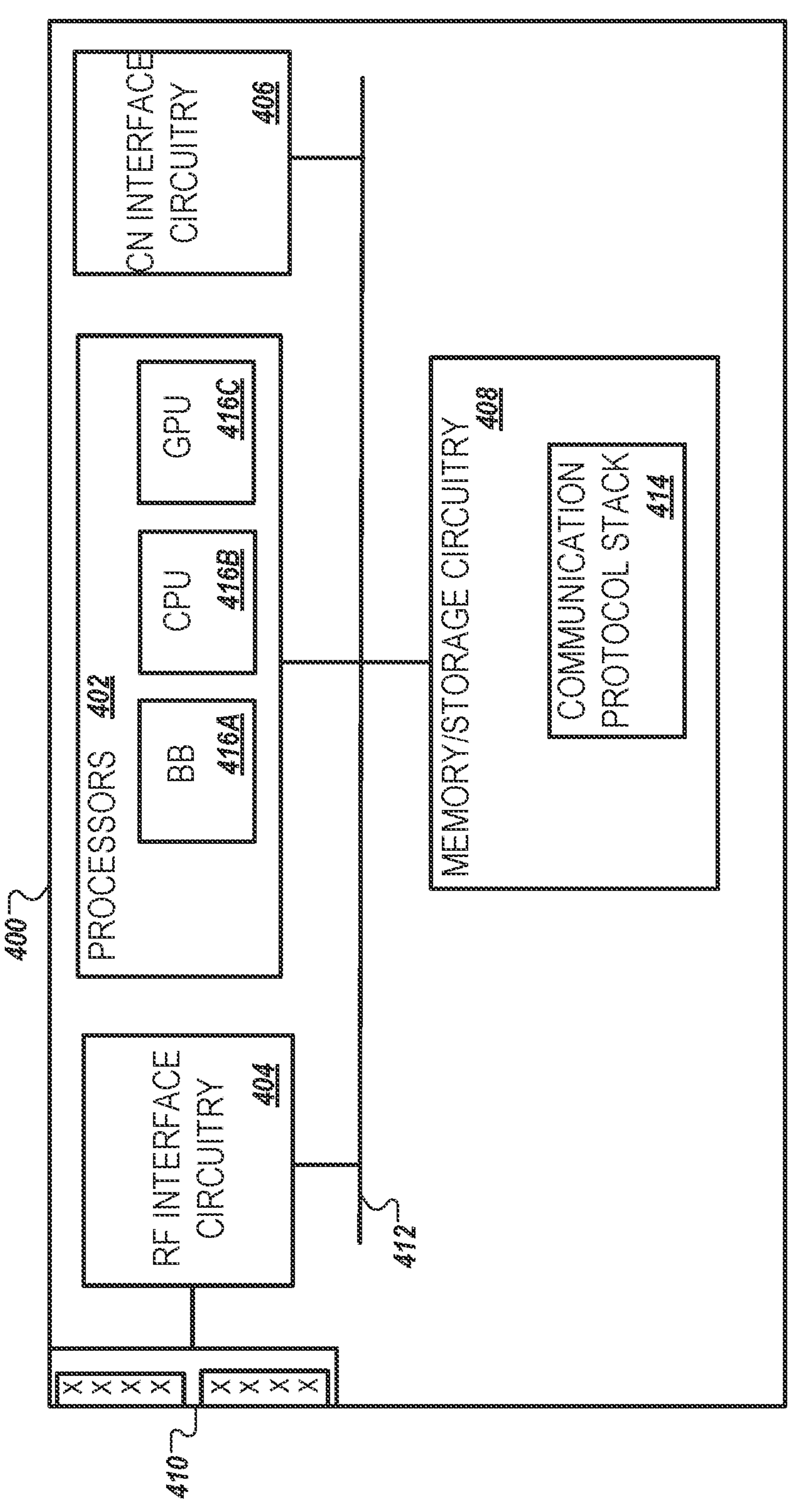
FIG. 4 illustrates an example access node, according to some implementations.

FIG. 4 illustrates an example access node 400 (e.g., a base station or gNB), according to some implementations. The access node 400 may be similar to and substantially interchangeable with base station 104. The access node 400 may include processors 402, RF interface circuitry 404, core network (CN) interface circuitry 406, memory/storage circuitry 408, and one or more antenna(s) 410.

The components of the access node 400 may be coupled with various other components over one or more interconnects 412. The processors 402, RF interface circuitry 404, memory/storage circuitry 408 (including communication protocol stack 414), antenna(s) 410, and interconnects 412 may be similar to like-named elements shown and described with respect to FIG. 3. For example, the processors 402 may include processor circuitry such as, for example, baseband processor circuitry (BB) 416A, central processor unit circuitry (CPU) 416B, and graphics processor unit circuitry (GPU) 416C.

The CN interface circuitry 406 may provide connectivity to a core network, for example, a 5th Generation Core network (5GC) using a 5GC-compatible network interface protocol such as carrier Ethernet protocols, or some other suitable protocol. Network connectivity may be provided to/from the access node 400 via a fiber optic or wireless backhaul. The CN interface circuitry 406 may include one or more dedicated processors or FPGAs to communicate using one or more of the aforementioned protocols. In some implementations, the CN interface circuitry 406 may include multiple controllers to provide connectivity to other networks using the same or different protocols.

As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can include ground stations (e.g., terrestrial access points) or satellite stations providing coverage within a geographic area (e.g., a cell). As used herein, the term "NG RAN node" or the like may refer to an access node 400 that operates in an NR or 5G system (for example, a gNB), and the term "E-UTRAN node" or the like may refer to an access node 400 that operates in an LTE or 4G system (e.g., an eNB). According to various implementations, the access node 400 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some implementations, all or parts of the access node 400 may be implemented as one or more software entities running on server computers as part of a virtual network, which may be referred to as a CRAN and/or a virtual baseband unit pool (vBBUP). In V2X scenarios, the access node 400 may be or act as a "Road Side Unit." The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Although the embodiments above have been described in considerable detail, numerous variations and modifications will become apparent to those skilled in the art once the above disclosure is fully appreciated. It is intended that the following claims be interpreted to embrace all such variations and modifications.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

We claim:

1. A method to be performed by a user equipment (UE), the method comprising:
- receiving, from a base station, an indication to accumulate a transmit power control (TPC) adjustment value across multiple commands, the accumulated TPC adjustment value used to calculate an uplink (UL) transmit power;
- detecting at least one UE action that triggers adjusting the accumulated TPC adjustment value; and
- in response to detecting the at least one UE action, adjusting the accumulated TPC adjustment value by setting the accumulated value to zero, decreasing the accumulated TPC adjustment value by a first predetermined value, or increasing the accumulated TPC adjustment value by a second predetermined value.

2. The method of claim 1, the method further comprising:
- using the accumulated TPC adjustment value to calculate the UL transmit power.

3. The method of claim 2, wherein the UL transmit power is one of: a Physical Uplink Shared Channel (PUSCH) transmission power, a Physical Uplink Control Channel (PUCCH) transmission power, or a Sounding Reference Signal (SRS) transmission power.

4. The method of claim 1, wherein the at least one UE action comprises at least one of switching an antenna, switching a Synchronization Signal Block (SSB), or switching a beam.

5. The method of claim 4, wherein the antenna is a transmit antenna or a receive antenna of the UE, and wherein the beam is a transmit beam or a receive beam.

6. The method of claim 4, wherein the SSB is a tracking SSB.

7. The method of claim 1, wherein adjusting the accumulated TPC adjustment value comprises setting the accumulated TPC adjustment value to zero.

8. The method of claim 1, wherein adjusting the accumulated TPC adjustment value comprises:
- determining that the accumulated TPC adjustment value is greater than a predetermined threshold; and
- responsively decreasing the accumulated TPC adjustment value by the first predetermined value.

9. The method of claim 1, wherein adjusting the accumulated TPC adjustment value comprises:
- determining that the accumulated TPC adjustment value is less than a predetermined threshold; and
- responsively increasing the accumulated TPC adjustment value by the second predetermined value.

10. One or more processors of a user equipment (UE) configured to perform operations comprising:
- receiving, from a base station, an indication to accumulate a transmit power control (TPC) adjustment value across multiple commands, the accumulated TPC adjustment value used to calculate an uplink (UL) transmit power;

detecting at least one UE action that triggers adjusting the accumulated TPC adjustment value; and in response to detecting the at least one UE action, adjusting the accumulated TPC adjustment value by setting the accumulated value to zero, decreasing the accumulated TPC adjustment value by a first predetermined value, or increasing the accumulated TPC adjustment value by a second predetermined value.

11. The one or more processors of claim 10, the operations further comprising:

using the accumulated TPC adjustment value to calculate the UL transmit power.

12. The one or more processors of claim 10, wherein the UL transmit power is one of: a Physical Uplink Shared Channel (PUSCH) transmission power, a Physical Uplink Control Channel (PUCCH) transmission power, or a Sounding Reference Signal (SRS) transmission power.

13. The one or more processors of claim 10, wherein the at least one UE action comprises at least one of switching an antenna, switching a Synchronization Signal Block (SSB), or switching a beam.

14. The one or more processors of claim 13, wherein the antenna is a transmit antenna or a receive antenna of the UE, and wherein the beam is a transmit beam or a receive beam.

15. The one or more processors of claim 13, wherein the SSB is a tracking SSB.

16. The one or more processors of claim 10, wherein adjusting the accumulated TPC adjustment value comprises resetting the accumulated TPC adjustment value to zero.

17. A user equipment (UE) configured to perform operations comprising:

receiving, from a base station, an indication to accumulate a transmit power control (TPC) adjustment value across multiple commands, the accumulated TPC adjustment value used to calculate an uplink (UL) transmit power;

detecting at least one UE action that triggers resetting the accumulated TPC adjustment value; and in response to detecting the at least one UE action, adjusting the accumulated TPC adjustment value by setting the accumulated value to zero, decreasing the accumulated TPC adjustment value by a first predetermined value, or increasing the accumulated TPC adjustment value by a second predetermined value.

18. The UE of claim 17, the operations further comprising:

using the accumulated TPC adjustment value to calculate the UL transmit power.

19. The UE of claim 17, wherein the UL transmit power is one of: a Physical Uplink Shared Channel (PUSCH) transmission power, a Physical Uplink Control Channel (PUCCH) transmission power, or a Sounding Reference Signal (SRS) transmission power.

20. The UE of claim 17, wherein the at least one UE action comprises at least one of switching an antenna, switching a Synchronization Signal Block (SSB), or switching a beam.

* * * * *